May 15, 1962     M. W. BEAN, JR     3,034,708
GRAPHIC COMPUTER
Filed June 1, 1961     2 Sheets-Sheet 1
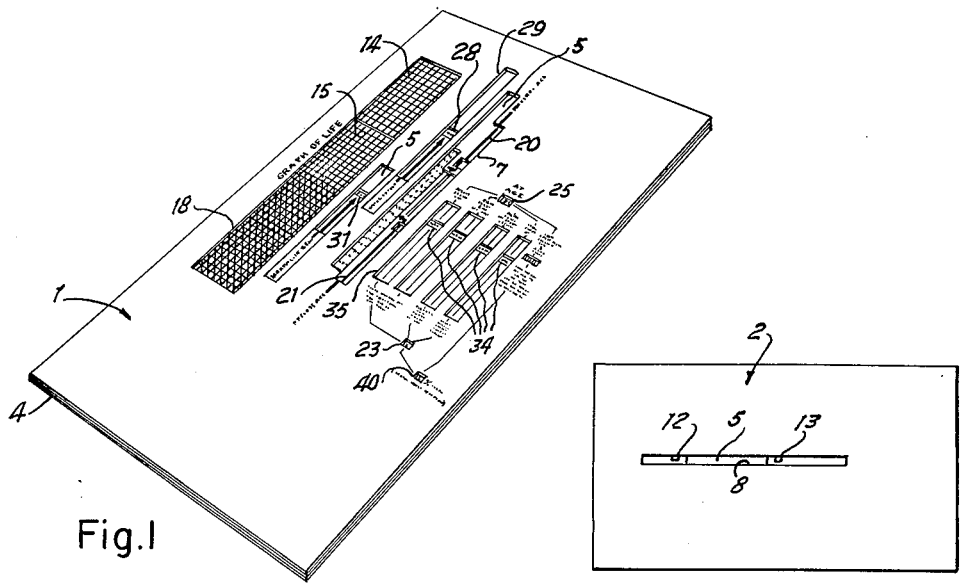
Fig. 1
Fig. 2
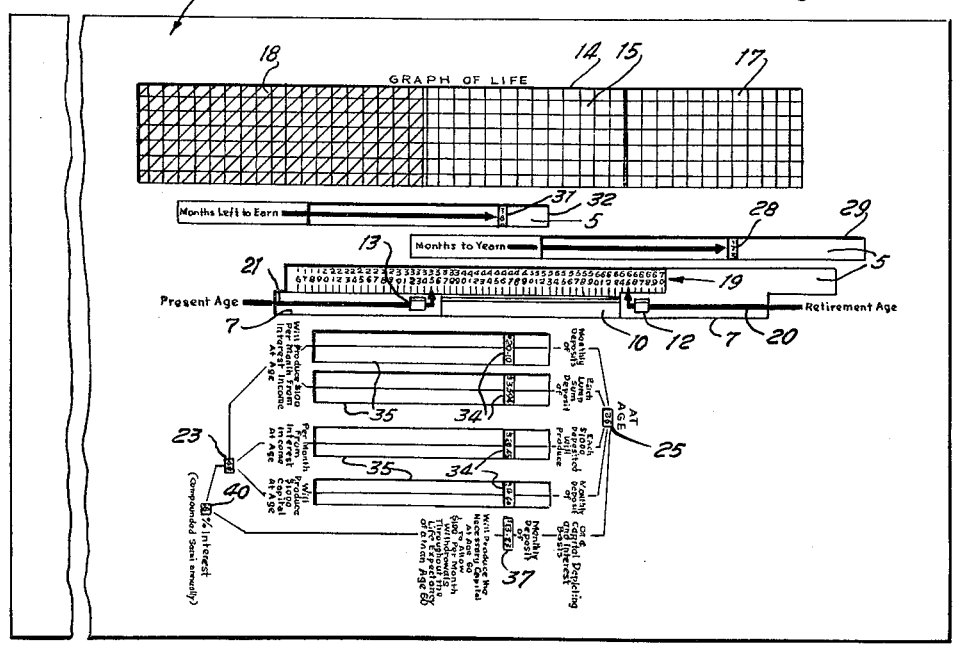
Fig. 3
INVENTOR
Malcolm W. Bean, Jr.
BY *Cecil L. Stood*
ATTORNEY INVENTOR
Malcolm W. Bean, Jr.

BY

ATTORNEY

United States Patent Office 3,034,708
Patented May 15, 1962

3,034,708
GRAPHIC COMPUTER
Malcolm W. Bean, Jr., 341 Waverly Drive,
Corpus Christi, Tex.
Filed June 1, 1961, Ser. No. 114,159
3 Claims. (Cl. 235—61)

This invention relates to a graphic computer, and it concerns more particularly a slide rule type of device, for the use of life underwriters, actuaries, and others, for conveniently displaying for visual inspection selected statistical information related to the present age of a given individual, or to his expected retirement age, or both.

An object of the invention is to provide a device as described for indicating the time interval between an individual's present age and his expected retirement age, together with other information related to the length of such time interval.

Another object of the invention is to provide, in such a device, means for indicating the life expectancy of an individual following a selected retirement age, as determined by standard tables of mortality experience.

Another object of the invention is to provide such a device having means for displaying information related to the time interval between a selected age, corresponding to the present age of an individual, and a predetermined age.

The invention will be readily understood by referring to the following description and the accompanying drawing, in which:

FIGURE 1 is a perspective view of a device embodying the invention, showing the front and two adjacent edges thereof.

FIGURE 2 is a view on a reduced scale showing the back of the device.

FIGURE 3 is a view on an enlarged scale showing the front thereof; and

Figure 4:
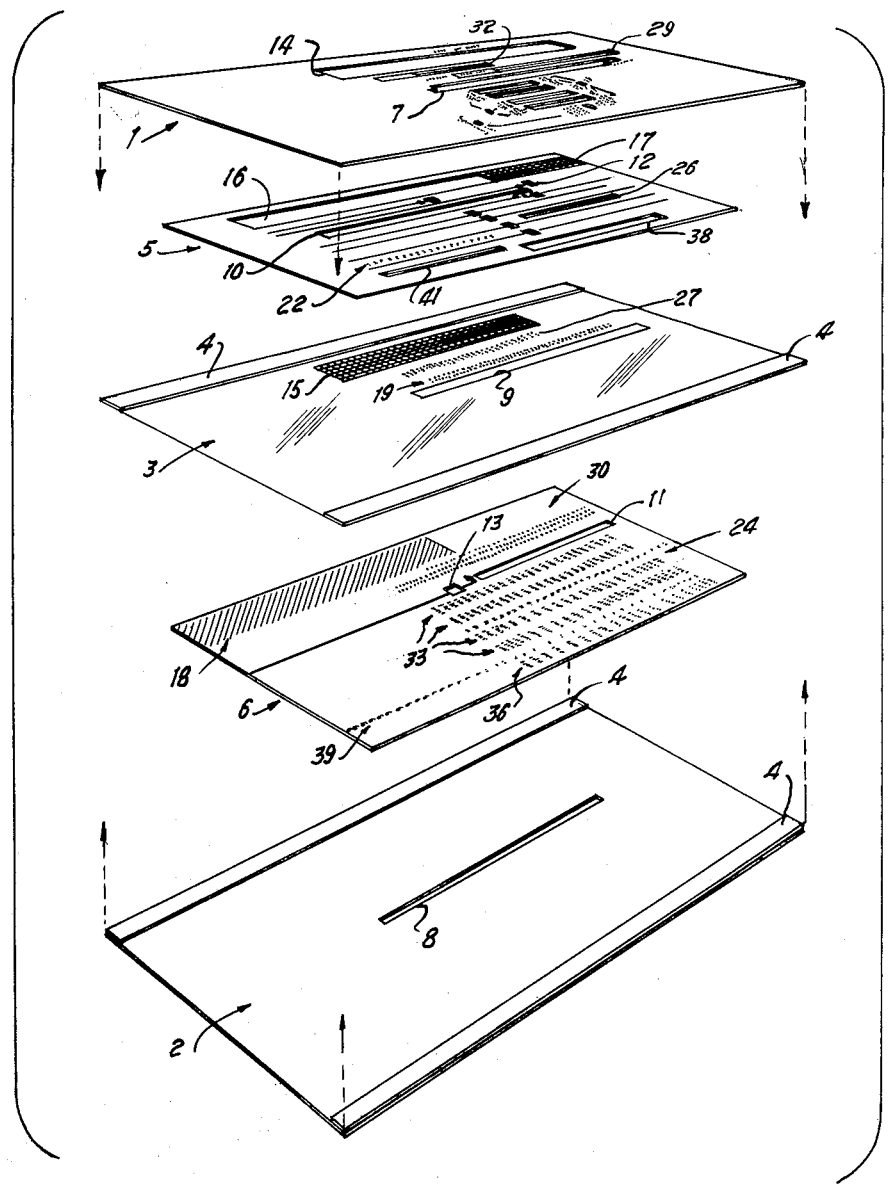
FIGURE 4 is an exploded perspective view.

As shown best in FIGURE 4, the device of the invention includes a front cover 1 and a back cover 2, each of which consists of a rectangular piece of relatively stiff cardboard. The front cover 1 and the back cover 2, which are of the same size, are fastened together along two opposite side edges, as by means of an adhesive, with a sheet of transparent plastic material 3 between them.

The sheet of transparent plastic material 3, which is of the same size as the covers 1 and 2, is spaced apart from the covers 1 and 2, respectively, by two pairs of spacer strips 4, which are arranged along the connected marginal portions of the covers 1 and 2, on opposite sides of the sheet of transparent plastic material 3.

A first slide 5 and a second slide 6, each of which consists of a rectangular piece of cardboard, narrower than the covers 1 and 2 and the sheet of transparent plastic material 3, are slidably disposed between the spacer strips 4 of the two pairs, respectively, on opposite sides of the sheet of transparent plastic material 3 and in juxtaposed relation to the covers 1 and 2, respectively.

Mutually aligned longitudinal slots 7, 8, and 9 are formed in the covers 1 and 2 and the sheet of transparent plastic material 3, respectively, centrally thereof. Corresponding slots 10 and 11, which are aligned with the slots 7, 8, and 9 and are offset longitudinally relative to each other, are formed in the slides 5 and 6, respectively.

Holes 12 and 13, which are formed in the slides 5 and 6, respectively, adjacent opposite ends of the slots 10 and 11, are selectively engageable by a pointed instrument whereby the slides 5 and 6 are each adjustable longitudinally, independently of the other, relative to the covers 1 and 2 and the sheet of transparent plastic material 3.

The front cover 1 has an elongated rectangular window opening 14 formed in one side thereof, immediately adjacent its connected edge, and the corresponding portion of the sheet of transparent plastic material 3, which is visible through the opening 14 of the front cover 1, has a scale or graph 15 printed thereon.

A corresponding window opening 16, which is aligned with the opening 14 of the front cover 1 and is offset longitudinally relative thereto, is formed in the first slide 5. The first slide 5 has a contrastingly lined or shaded area 17 adjacent one end of the opening 16 which is visible through the opening 14 and partially covers the scale or graph 15.

The second slide 6 has a contrastingly lined or shaded area 18 which is offset longitudinally relative to the lined or shaded area 17 of the first slide 5 and is visible through the opening 14 of the front cover, the opening 16 of the first slide 5, and the scale or graph 15 of the sheet of transparent plastic material 3.

The sheet of transparent plastic material 3 has printed thereon, along one side of the slot 9 thereof and immediately adjacent thereto, a scale 19 bearing numerals corresponding to a man's age, in years. The scale 19 is visible through lateral extensions of the slot 7 of the front cover 1 and the slot 10 of the first slide 5.

A first pointer 20, which is printed on the first slide 5 and is visible through the slot 7 of the front cover 1, is adapted to register with the calibrations of the scale 19 to indicate a selected age corresponding to an individual's expected retirement age.

A second pointer 21, which is printed on the second slide 6 and is visible through the slot 7 of the front cover 1, the slot 9 of the sheet of transparent plastic material 3, and the slot 10 of the first slide 5, is adapted to register with the calibrations of the scale 19 to indicate a selected age corresponding to the present age of an individual.

A series of numerals 22, which are printed on the first slide 5 and are visible individually through a window opening 23 of the front cover 1, each correspond to a selected position of the first pointer 20 relative to the calibrations of the scale 19.

A series of numerals 24, which are printed on the second slide 6 and are visible individually through a window opening 25 of the front cover 1, the sheet of transparent plastic material 3, and an elongated slot 26 formed in the first slide 5, each correspond to a selected position of the second pointer 21 relative to the calibrations of the scale 19.

A series of numerals 27, which are printed on the sheet of transparent plastic material 3 opposite the calibrations of the scale 19, and are visible individually through a window opening 28 of the first slide 5 and an elongated slot 29 of the front cover 1, each indicate the life expectancy of an individual following a selected retirement age corresponding to the position of the first pointer 20 relative to the scale 19.

A series of numerals 30, which are printed on the second slide 6 and are offset laterally relative to the numerals 27, are visible individually through a window opening 31 of the first slide 5, an elongated slot 32 of the front cover 1, and the sheet of transparent plastic material 3. The numerals 30 each indicate, in months, a time interval between the present age of an individual and a selected retirement age represented by the positions of the second pointer 21 and the first pointer 20, respectively, relative to the scale 19.

A plurality of columns of numerals 33, which are printed on the second slide 6 and are arranged parallel to the series of numerals 30, are visible individually through window openings 34 of the first slide 5, elongated slots 35 of the front cover 1, and the sheet of transparent plastic material 3.

The numerals 33 may consist of certain statistical information, as desired, which is a function of the time interval between an individual's present age and his expected retirement age.

A series of numerals 36, which are printed on the second slide 6, are visible individually through a window opening 37 of the front cover 1, an elongated slot 38 of the first slide 5, and the sheet of transparent plastic material 3.

The numerals 36 may consist of certain statistical information which is a function of the time interval between a selected age, corresponding to the present age of an individual, and a predetermined age.

The numeral 39 indicates a series of numerals which are printed on the second slide 6 and are visible individually through a window opening 40 of the front cover 1, an elongated slot 41 of the first slide 5, and the sheet of transparent plastic material 3.

The numerals 39 each may indicate a rate of interest or other factor which is used in computing the information represented by the numerals 33 and 36, and which may or may not be constant.

The invention may be modified in various ways without departing from the spirit and scope thereof.

What is claimed is:

1. A slide rule type of computing device for displaying for visual inspection selected statistical information related to the present age of a given individual and a selected retirement age comprising a flat rectangular casing, open at its ends, having a front and a back each formed of cardboard, and having a sheet of transparent plastic material arranged between the front and back thereof, in spaced apart relation thereto, and a first slide and a second slide each formed of cardboard slidably disposed within the casing, on opposite sides of the sheet of transparent plastic material, in juxtaposed relation to the front and back, respectively, a scale on the sheet of transparent plastic material, visible through slots in the first slide and the front of the casing, bearing numerals corresponding to an individual's age, in consecutive order, a first pointer carried by the first slide, visible through the slot in the front of the casing, adapted to register with the calibrations of the scale to indicate a selected age corresponding to an individual's expected retirement age, a second pointer carried by the second slide, visible through a slot in the sheet of transparent plastic material and the slots in the first slide and the front of the casing, adapted to register with the calibrations of the scale to indicate a selected age corresponding to the present age of an individual, means for adjusting the first and second slides longitudinally relative to the casing and relative to each other, and a series of numerals carried by the second slide, visible selectively through a window in the first slide and a slot in the front of the casing, each indicating a time interval between the present age of an individual and a selected retirement age represented by the positions of the first and second pointers relative to the scale and relative to each other.

2. The structure of claim 1, and a series of numerals carried by the first slide, and positioned opposite the calibrations of the scale, visible selectively through a window opening of the first slide and a slot in the front of the casing, each indicating the life expectancy of an individual following a selected retirement age corresponding to the position of the first pointer relative to the scale.

3. The structure of claim 1, and a plurality of columns of numerals carried by the second slide, positioned opposite the last mentioned series of numerals thereon and visible selectively through window openings in the first slide and slots in the front of the casing, comprising statistical information which is a function of the time interval between an individual's present age and his expected retirement age.

References Cited in the file of this patent

UNITED STATES PATENTS

| | | |
|---|---|---|
| 2,434,306 | Wood | Jan. 13, 1948 |
| 2,746,682 | Zak | May 22, 1956 |